US011985573B1

(12) United States Patent
Engelhart (10) Patent No.: US 11,985,573 B1
(45) Date of Patent: May 14, 2024

(54) METHODS AND SYSTEMS FOR REPORTING ZERO USAGE FOR IMMEDIATE TRIGGER TYPES

(71) Applicant: T-Mobile USA, Inc., Bellevue, WA (US)

(72) Inventor: Robert L. Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 203 days.

(21) Appl. No.: 17/489,068

(22) Filed: Sep. 29, 2021

(51) Int. Cl.
*H04W 4/24* (2018.01)
*H04M 15/00* (2006.01)
*H04W 8/18* (2009.01)
*H04W 24/08* (2009.01)

(52) U.S. Cl.
CPC ............. *H04W 4/24* (2013.01); *H04M 15/41* (2013.01); *H04W 8/18* (2013.01); *H04W 24/08* (2013.01)

(58) Field of Classification Search
CPC ......... H04W 4/24; H04W 8/18; H04W 24/08; H04M 15/41
USPC ....................................................... 455/406
See application file for complete search history.

(56) References Cited

U.S. PATENT DOCUMENTS

| | | | |
|---|---|---|---|
| 9,215,725 B2 | 12/2015 | Behnamfar et al. | |
| 9,832,743 B2 | 11/2017 | Lee et al. | |
| 10,869,199 B2 * | 12/2020 | Raleigh | G06Q 40/00 |
| 11,425,262 B2 * | 8/2022 | Kaki | H04M 15/00 |
| 2014/0094159 A1 * | 4/2014 | Raleigh | H04W 24/02 |
| | | | 455/418 |
| 2019/0149666 A1 * | 5/2019 | Senarath | H04M 15/66 |
| | | | 455/406 |
| 2019/0259097 A1 * | 8/2019 | Raleigh | H04M 15/68 |
| 2020/0267802 A1 * | 8/2020 | Engelhart | H04M 15/70 |
| 2021/0377807 A1 * | 12/2021 | Lee | H04W 28/12 |
| 2022/0022011 A1 * | 1/2022 | Bhatnagar | H04M 17/20 |
| 2022/0109759 A1 * | 4/2022 | Bhoria | H04M 15/66 |
| 2023/0035850 A1 * | 2/2023 | Silver | H04M 15/8044 |
| 2023/0080830 A1 * | 3/2023 | Fernandez Alonso | |
| | | | H04M 15/8038 |
| | | | 455/422.1 |

FOREIGN PATENT DOCUMENTS

WO    WO-2022033944 A1 *  2/2022

\* cited by examiner

*Primary Examiner* — Mong-Thuy T Tran
(74) *Attorney, Agent, or Firm* — Lee & Hayes, P.C.

(57) ABSTRACT

Methods and systems for reporting zero usage for immediate trigger types are discussed herein. According to an implementation a communication session is established between a user equipment (UE) and the 5G network to provide service/content requested by the UE. A session management function (SMF) may receives a message from the UE to report the usage of one or more data units granted to the UE. The message indicates that an event occurs during a zero-usage time period. The SMF determines whether the event triggers a charging condition. When the event triggers a charging condition that needs to be reported immediately, the SMF sends a charging data request to a charging function (CHF) to report the event, regardless the one or more data units have zero-usage.

15 Claims, 9 Drawing Sheets

METHODS AND SYSTEMS FOR REPORTING ZERO USAGE FOR IMMEDIATE TRIGGER TYPES

BACKGROUND

3GPP standards define multiple default trigger conditions and their categories supported by 5G Session Management Function (SMF) (3GPP TS 32.255). When a charging event is issued towards the Charging Function (CHF), it includes details such as subscriber identifier, charging-ID, etc. It also includes identifying the volume count of the data units separated for uplink and downlink traffic, with charging condition change information. Each trigger condition (i.e., chargeable event) defined for the 5G data connectivity converged charging functionality, is specified with the associated behavior when they are met.

There are two categories of chargeable events: immediate report and deferred report. In immediate report, chargeable events for which, when occurring, the current volume count of the data units are closed and sent together with the charging data generated by the SMF towards the CHF in a charging data request. In a deferred report, chargeable events for which, when occurring, the current volume count of the data units are closed and stored together with the charging data generated by the SMF. The stored counts will be sent to the CHF in next charging data request. According to current 5G CHF selection, zero or no usage trigger conditions are suppressed on the N40 interface to reduce messaging busy hour transaction (BHT) and message payload sizes. This causes that some immediate trigger conditions, i.e., radio access technology (RAT) type, are not reported immediately.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for reporting zero usage data units between 5G SMF and CHF N40 interface are discussed herein. In some examples, a method for reporting zero usage data units between 5G SMF and CHF N40 interface may comprise receiving, at the SMF, a message in a communication session established between the UE and a network. An initial charging process is performed when the communication session is established. During the initial charging process, one or more data units are granted to the UE to receive content and/or service from the providers. The message received during the communication session includes information related to the communication session and the usage of the one or more granted data units. The SMF may further determine, from the message, usage of the plurality of data units and determining that an event occurs during the communication session. When the event triggers a charging condition, the method for reporting zero usage data units between 5G SMF and CHF N40 interface may further comprise generating a charging data request based on the usages of the plurality of data units and the event.

In some implementations, when an event occurs during the communication session, the method may further determine whether the event is associated with a data unit having zero usage. In some other implementations, the event may be associated with a data unit which has a usage level being below a threshold.

In some implementations, the method may further comprise determining that the event indicates at least one of a radio access technology (RAT) change or a rating information change; associating an immediate report category with the event; transmitting, to a charging function (CHF), the charging data request; and reporting, to the CHF, the event in the charging data request.

In some implementations, the event indicates the rating information change and the method may further comprise receiving, from the UE, a request to grant additional data units; transmitting, to the CHF, the request, causing the CHF to perform actions including: determining a rating information corresponding to the request, and determining that a user account has sufficient balance based on the rating information and the additional data units; and receiving, from the CHF, an approval to grant the additional data units to the UE.

In some implementations, the method may further comprise obtaining a default category associated with the event; and in response to the default category being a deferred report category, restoring the event to the default category.

In some implementations, the method may further comprises determining that the event indicates neither radio access technology (RAT) change nor rating information change; associating a deferred report category with the event; storing the event in a cache; and reporting, to a charging function (CHF), the event in a subsequent charging data request.

In some implementations, an individual data unit is configured with 1 GB bandwidth.

In some implementations, the techniques discussed herein may be implemented in the context of protocols associated with one or more of 3G, 4G, 4G LTE, and/or 5G protocols. In some examples, the network implementations may support standalone architectures, non-standalone architectures, dual connectivity, carrier aggregation, etc. Example implementations are provided below with reference to the following figures.

Figure 1:
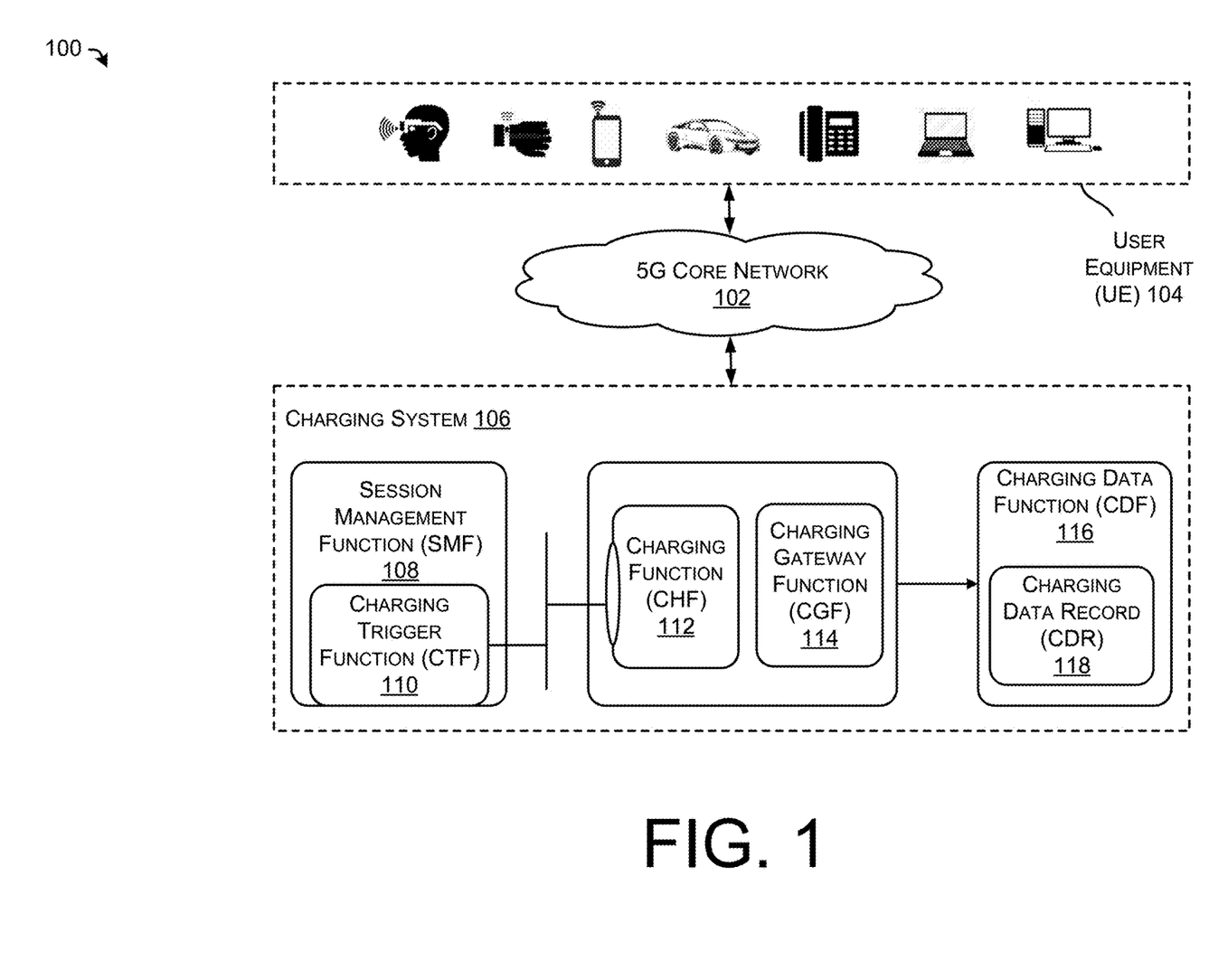
FIG. 1 illustrates an example charging scenario in a 5G network, in which a session management function (SMF) acts as a charging trigger function (CTF).

FIG. 1 shows an example charging scenario in a 5G network, in which a session management function (SMF) acts as a charging trigger function (CTF).

The charging scenario 100 may be associated with various operation entities in a 5G network such as a 5G core network 102 and one or more access points (not shown) linked to the core network 102. The core network 102 and the access points may be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The charging scenario 100 may also comprise a plurality of user equipment (UE) 104. The UE 104 may be any device that can connect to the 5G core network 102 through the one or more access points. In some examples, the UE 104 may be a mobile device, such as a cellular phone or a smart phone. In other examples, the UE 104 may be a traditional landline phone. In other examples, the UE 104 may be an IP phone. In yet other examples, the UE 104 may be a personal digital assistant (PDA), a media player, a tablet computer, a gaming device, a personal computer (PC) such as a laptop, desktop, or workstation, or any other type of computing or communication device. In some examples, the UE 104 may include the computing devices implemented on the vehicle such as an autonomous vehicle or a self-driving vehicle. In some examples, the UE 104 may be a wearable device such as a smart watch, smart glasses, etc.

The access points may include one or more base stations that communicate with the UE 104 and the core network 102. In some examples, the base station may be associated with an LTE access network known as an Evolved UMTS Terrestrial Radio Access Network (E-UTRAN). Base stations of the LTE access network can be known as eNBs. In some implementations, the base station may be associated with a 5G access network with base stations known as gNBs or as new radio (NR) base stations. The base station may connect to the 5G core network 102 via various interfaces for transmission of user data and/or control data. The UE 104 may access the services provided by the 5G core network 102 through different access points based on the types of the UE 104 and the type of the services.

The charging scenario 100 may further comprise a charging system 106 that performs the charging/billing functions directed to user accounts associated with the users of the 5G services.

In some implementations, a session management function (SMF) 108 may act as a charging trigger function (CTF) 110 in the charging system 106. A user may send a request for service delivery via the UE 104 to the 5G core network 102. The request for service delivery may initiate a session to be established for the UE 104.

Upon receiving the request for service delivery, the SMF 108 may establish a session for the UE 104 to receive the service. The session may be a protocol data unit (PDU) session. The request for service delivery may further trigger a charging request directed to the associated user account. The SMF 108 may communicate with a charging function (CHF) 112 in the charging system 106 to determine whether the user account has sufficient balance for the requested service. The SMF 108 may communicate with CHF 112 by sending a charging data request via N40 interface.

The CHF 112 may further forward a charging data request via a charging gateway function (CGF) 114 to a charging data function (CDF) 116 in the charging system 106. The CDF 116 may determine whether the user account has sufficient balance for the requested service based on a charging data record (CDR) 118. When the CDR indicates that the user account has sufficient balance for the requested service, the CHF 112 may send a charging data response to CHF 112 to approve the service delivery. The CDF 116 may further update the information associated with the user accounts in the CDR 118.

The communications between the SMF 108 and the CHF 112 may continue during the ongoing service delivery to the UE 104 until the service is terminated by the UE. The UE 104 may send messages related to service data flow in an established session to the SMF 108 in real-time or periodically. The service data flow may include the usages of one or more date units previously granted to the user. The SMF 108 may report the usages of the one or more date units previously granted to the user in a charging data request to CHF 112. In another example, the UE 104 may complete the service and send messages related to the usages of one or more final data units granted to the user to the SMF 108. In implementations, such message received at the SMF 108 during the established session acts as a charging event that may trigger the interactions between the SMF 108 and the CHF 112.

When a message triggers the interactions between the SMF 108 and the CHF 112, the message is considered as a chargeable event. There can be two categories associated with the chargeable events. One category can be immediate report, in which, the usages of the data units indicated in the message are reported together with a charging data generated by the SMF 108 toward the CHF 112 in a charging data request. Another category can be a deferred category, in which, the usages of the data units indicated in the message are stored in a local storage together with the charging data generated by the SMF 108. The stored usages are sent to the CHF 112 in a next charging data request, or when the storage limit is exhausted. As the SMF 108 also reports charging data related to the session in addition to the service data flow within the session, the message payload size may exceed a payload size threshold. Thus, in some implementations, the messages indicating zero usage of the data units are not reported to CHF 112 regardless of the category associated therewith. In other implementations, a message indicating zero usage of the data units may indicate a radio access technology (RAT) type change and/or a rating information change. The SMF 108 may report such a message using an immediate report category regardless of the default category associated therewith.

The elements of the charging system 106, i.e., the SMF 108, the CTF 110, the CHF 112, the CGF 114, and the CDF 116 may be implemented on one or more computing devices and/or data centers. The one or more computing devices may include but not limited to a single computing system or an edge host providing physical or virtual computing resources as known by persons skilled in the art. Other well-known computing devices, systems, environments and/or configurations that may be suitable for use with the examples described herein include, but are not limited to, personal computers, server computers, hand-held or laptop devices, multiprocessor systems, microprocessor-based systems, network PCs, mainframe computers, distributed computing environments, etc. The data centers may be a cloud storage that are associated with a plurality of physical storages located at one or more locations. The plurality of physical storages may span a plurality of servers, which sometimes are located in multiple locations. The physical storages are typically owned and managed by a hosting company. A cloud storage provider of the data center is responsible for securing the data stored therein and keeping the data accessible via the network. The cloud storage services may be accessible through a cloud computing service, a web service application programming interface (API) or by applications that utilize the API, such as cloud desktop storage, a cloud storage gateway, or a Web-based content management system.

It should be appreciated that the charging scenario 100 in a 5G network is merely for illustrative purposes. The present disclosure is not intended to be limiting. For example, the charging system 106 may include other network functions (NFs) to act as the charging trigger function. The charging system 106 may be deployed in 5G equivalent wireless network or later generation wireless network. The use of the terms described above is also meant to include any different named 5G equivalents or later generation equivalents.

Figure 2A:
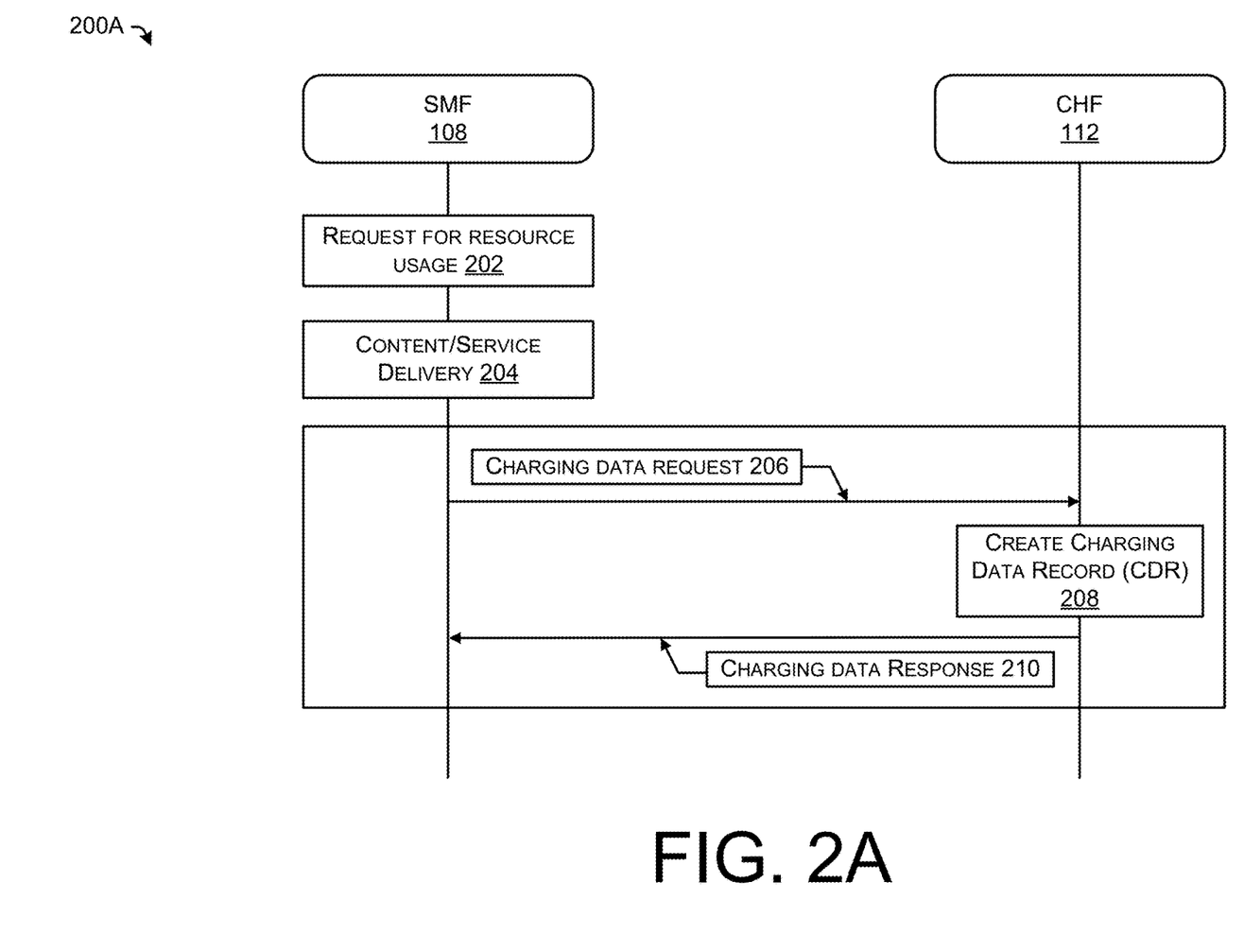
FIG. 2A illustrates an example event-based charging scenario in a 5G network according to the present disclosure.

FIG. 2A shows an example event-based charging scenario in a 5G network.

The event-based charging scenario 200A shows a post event charging (PEC) scenario, where the charging trigger function (CTF) of the network function (NF) interacts with the charging function (CHF) after the content and/or service delivery. In some implementations, the SMF 108 in FIG. 1 may act as the CTF and the function of the CHF may be performed by the CHF 112 in FIG. 1.

According to the charging scenario 200A, the SMF 108 may receive a request for resource usage 202 from a UE (i.e., the UE 104 in FIG. 1). The request for resource usage 202 may be related to various service types provided through the 5G network including but not limited to, voice service, short messaging service (SMS), multimedia messaging service (MMS), video service, data service, etc. In implementations, the request for resource usage 202 may be related to data service with various bandwidth requirements. The request for resource usage 202 may indicate a number of data units and/or serving units to be granted to the user in order to receive the resource. The size of the data unit and/or the serving unit may vary between MBs and GBs, for example, 500 MBs, 1 GB, etc. Upon receiving the request for resource usage 202, the SMF 108 may establish a session to deliver the content and/or service requested by the user. In some examples, the session may include a protocol data unit (PDU) session. Once the number of data units are granted to the user, the content/service delivery 204 is performed within the session.

The charging process may start after the content/service delivery as a post-event charging. The SMF 108 may send a charging data request 206 to CHF 112. The charging data request 206 includes the charging data generated with respect to the request for resource usage. After receiving the charging data request 206, the CHF 112 may create a charging data record (CDR) 208 for a user account associated with the UE 104. The CHF 112 then send a charging data response 210 back to the SMF 108 after the CDR is created.

Figure 2B:
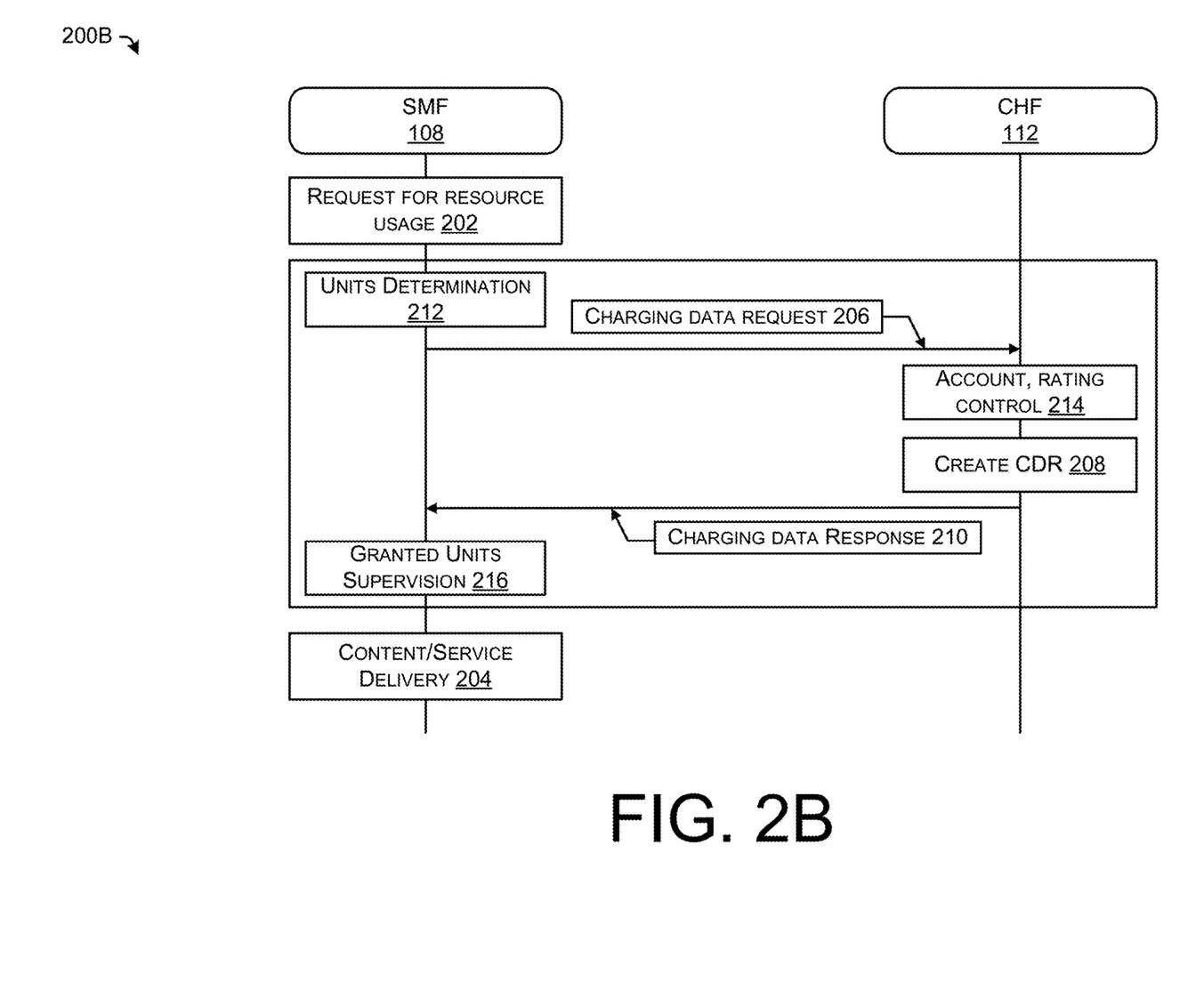
FIG. 2B illustrates another example event-based charging scenario in a 5G network according to the present disclosure.

FIG. 2B shows another example event-based charging scenario in a 5G network.

The event-based charging scenario 200B shows an immediate event charging (IEC) scenario, where the charging trigger function (CTF) of the network function (NF) interacts with the charging function (CHF) prior to the content and/or service delivery. Similar to the charging scenario 200A, the operations of the CTF may be performed by SMF 108 in FIG. 1 and the operations of the CHF may be performed by the CHF 112 in FIG. 1.

According to the charging scenario 200B, after the SMF 108 receives a request for resource usage 202 from a UE (i.e., the UE 104 in FIG. 1), the charging process starts immediately.

The SMF 108 may perform units determination 212 based on the request for resource usage 202. For example, the request for resource usage 202 may indicate that the UE 104 requests five 1 GB data units. The SMF 108 transmits the charging data request 206 including the requested data units information to CHF 112.

The charging data request 206 may comprise other information related to the UE time zone, tariff time, public land mobile network (PLMN) code, radio access technology (RAT) type, rating group, etc.

Upon receiving the charging data request 206, the CHF 112 may perform account and/or rating control 214 based on the requested data units information and the other information described above. The CHF 112 further creates a charging data record (CDR) 208 for a user account associated with the UE 104 and sends the charging data response 210 to the SMF 108. The charging data response 210 may include an approval for the requested data units.

Once the requested data units are approved, the SMF 108 may perform granted units supervision 216 to monitor the usage of the granted data units. Meanwhile, the SMF 108 may establish a session to deliver the content and/or service requested by the user. The granted units supervision 216 may be performed during the session until the session is released.

Figure 3:
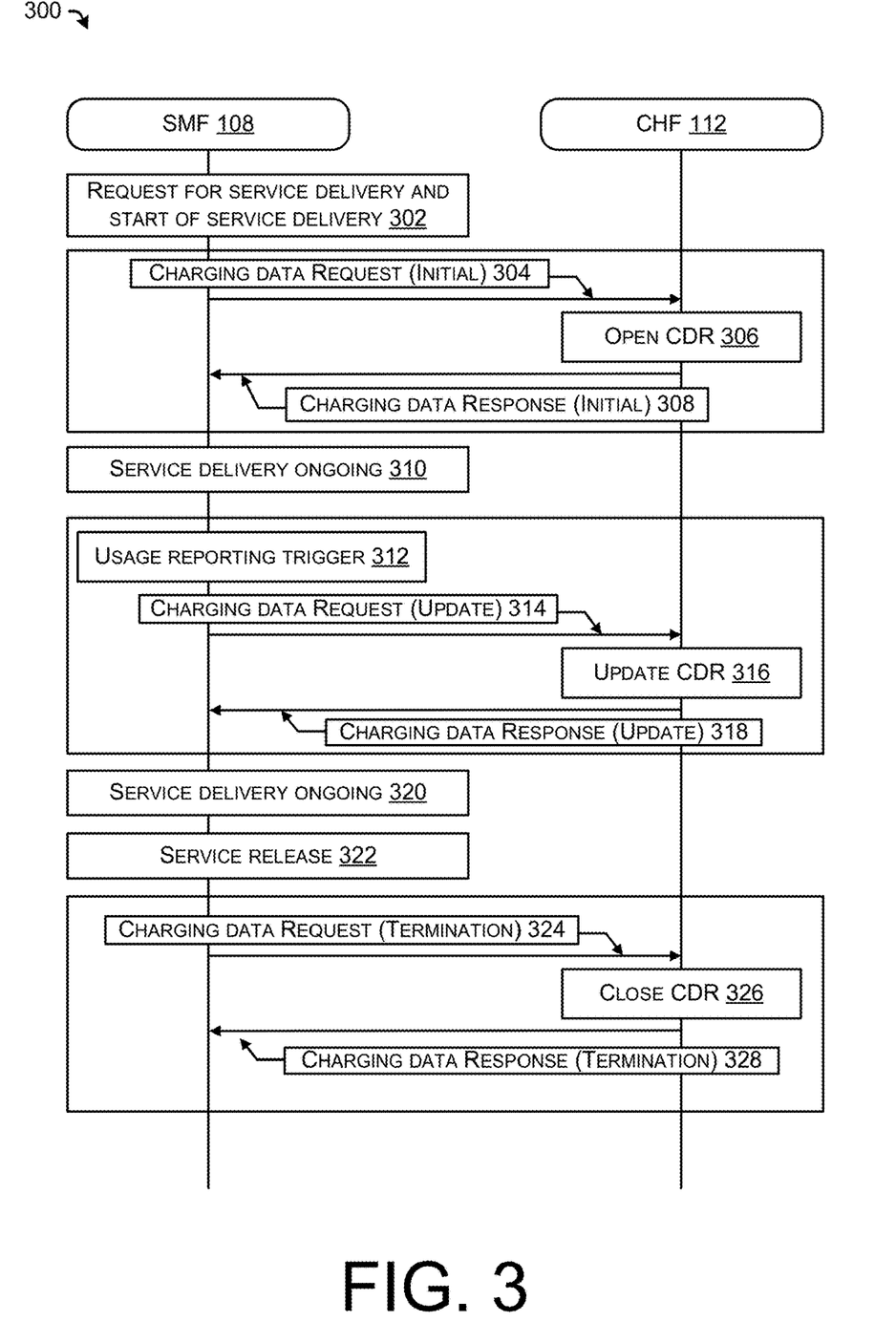
FIG. 3 illustrates an example session-based charging scenario in a 5G network according to the present disclosure.

FIG. 3 shows an example session-based charging scenario in a 5G network.

The session-based charging scenario 300 shows a session-based charging (IEC) scenario, where the charging trigger function (CTF) of the network function (NF) interacts with the charging function (CHF) during the session, in which content and/or service is delivered to the UE. Similar to the charging scenarios 200A and 200B, the operations of the CTF may be performed by SMF 108 in FIG. 1 and the operations of the CHF may be performed by the CHF 112 in FIG. 1.

According to the charging scenario 300, upon receiving a request for service delivery from a UE (i.e., the UE 104 in FIG. 1), the SMF 108 may establish a session (i.e., the PDU session) and start of service delivery (302). Similar to the charging scenarios 200A and 200B, the request for service delivery may be related to various service types provided through the 5G network such as SMS, multimedia messaging service MMS, video service, data service, etc. The request for service delivery may also include the number of data units that are requested by the UE for one or more 5G services. In implementations, the request for service delivery may further include other information related to charging/billing, for example, the UE time zone, tariff time, public land mobile network (PLMN) code, radio access technology (RAT) type, rating group, etc.

The SMF 108 may send an initial charging data request 304 to the CHF 112. The initial charging date request 304 may include the number of data units to be granted to the UE, the service type, the other information related to charging/billing described above. The CHF 112 may open an CDR (306) for a user account associated with the UE to record the number of data units being granted and the charging/billing information associated with the request. The CHF 112 then sends an initial charging data response 308 to the SMF 108.

During the session of service delivery, the SMF 108 may receive a service delivery ongoing message 310 in real-time.

The service delivery ongoing message 310 may be sent continuously or periodically during the session. The service delivery ongoing message 310 may trigger usage reporting 312 from the SMF 108 to the CHF 112. Upon receiving the service delivery ongoing message 310, the SMF 108 may send an updated charging data request 314 to the CHF 112 (i.e., immediately or deferred). The updated charging data request 314 may include a usage report of the previously granted data units and information related to charging/billing, etc. The CHF 112 may update the CDR 316 based on the updated charging data request 314 and send an updated charging data response 318 to the SMF 108.

The information carried by the service delivery ongoing message may include a trigger condition associated with a default reporting priority (i.e., immediate reporting or deferred reporting). Various trigger conditions and the associated reporting priorities can be configured at the SMF 108. Default trigger conditions currently configured at the SMF 108 may include but are not limited to, conditions related to the start of PDU session or the service data flow, conditions related to the change of charging, conditions related to limit per PDU session, conditions related to limit per rating group, conditions related to quota management, and other conditions. Each trigger condition is assigned with a default reporting priority. For example, the trigger conditions related to the change of charging includes QoS change with deferred reporting priority, user location change with deferred reporting priority, serving node change with deferred reporting priority, change of UE present in presence reporting area(s) with deferred reporting priority, UE time zone change with immediate reporting priority, tariff time change with deferred reporting priority, PLMN change with immediate reporting priority, RAT type change with immediate reporting priority, etc. Current default trigger conditions in the 5G system are defined by 3GPP TS 32.255 and are not detailed herein.

In implementations, the SMF 108 may be further configured to report messages indicating zero usage data units. Alternatively, or additionally, the SMF 108 may be configured to report messages indicating a data usage that is below a usage threshold. The reporting of zero usage can be combined with any trigger condition and/or reporting priority. In some examples, the various trigger conditions, the associated reporting priorities, and the zero usage reporting can be configured at the CHF 112 and transmitted from the CHF 112 to the SMF 108. The SMF 108 may be authorized to change the reporting priorities configured locally at the SMF 108. In a circumstance when the zero usage reporting is combined with a RAT change trigger condition, the zero usage is reported with an immediate priority. In another circumstance when the zero usage reporting is combined with a serving node change trigger condition, the SMF 108 changes the reporting priority associated with the serving node change from deferred reporting to immediate reporting and reports the zero usage immediately. The SMF 108 may reverse the reporting priority associated with the serving node change to the default reporting priority once the zero usage is reported to the CHF 112.

According to the information and the associated default category, the SMF 108 may report the message immediately or at a deferred time. For example, when the service delivery ongoing message indicates a UE time zone change, the SMF 108 reports the message immediately to the CHF 112. In another example, when the service delivery ongoing message indicates a serving node change, the SMF 108 defers reporting of the message in the next charging data request. In yet another example, when the service delivery ongoing message indicates an expiry of data volume limit per PDU session, the SMF 108 reports the message immediately to the CHF 112. In yet another example, when the service delivery ongoing message indicates an expiry of data time limit per PDU session, the SMF 108 reports the message immediately to the CHF 112.

In some examples, the information carried by the service delivery ongoing message may include one or more trigger conditions related to RAT type change and/or rating information. As such information may need to be reported immediately, the SMF 108 may override the default category associated with the one or more trigger conditions and report the message immediately to the CHF 112. For example, the service delivery ongoing message indicating a zero usage of a granted data unit may be reported in a deferred category or may not be reported. Nevertheless, in some examples, when the service delivery ongoing message indicates a zero usage of a granted data unit with a RAT type change, the SMF 108 reports the message in an immediate manner to the CHF 112.

In another examples, when the service delivery ongoing message indicates a zero usage of a granted data unit with a rating information change, the SMF 108 reports the message in an immediate manner to the CHF 112. In implementations, such conditions may be triggered when a handover takes place. The handover may occur between various radio access technologies such as, 5G to LTE, 5G to 4G/LTE, and vice versa. The handover may also occur between 5G/4G/LTE and the Wi-Fi access technology.

In some other examples, when the service delivery ongoing message indicates the usage of a granted data unit being below a threshold, the SMF 108 may report the service delivery ongoing message in a deferred category. However, if the service delivery ongoing message also indicates a rating information and/or RAT type change, the SMF 108 may override the deferred category and report the message in an immediate manner to the CHF 112.

Further, during the session of service delivery, the SMF 108 may continuously receive the service delivery ongoing message 320 until receiving a service release message 322 from the UE. The service release message 322 may include information of the usage of one or more final granted data units. Upon receiving the service release message 322, the SMF 108 may send a termination charging data request 324 to the CHF 112.

The termination charging data request 324 may include the information of the usage of one or more final granted data units. The CHF 112 may update the balance of the user account based on the termination charging data request 324 and close CDR (i.e., operation 326) associated with the user account. The CHF 112 may further send a termination charging data response 328 to the SMF 108 causing the SMF 108 to release the session.

Figure 4:
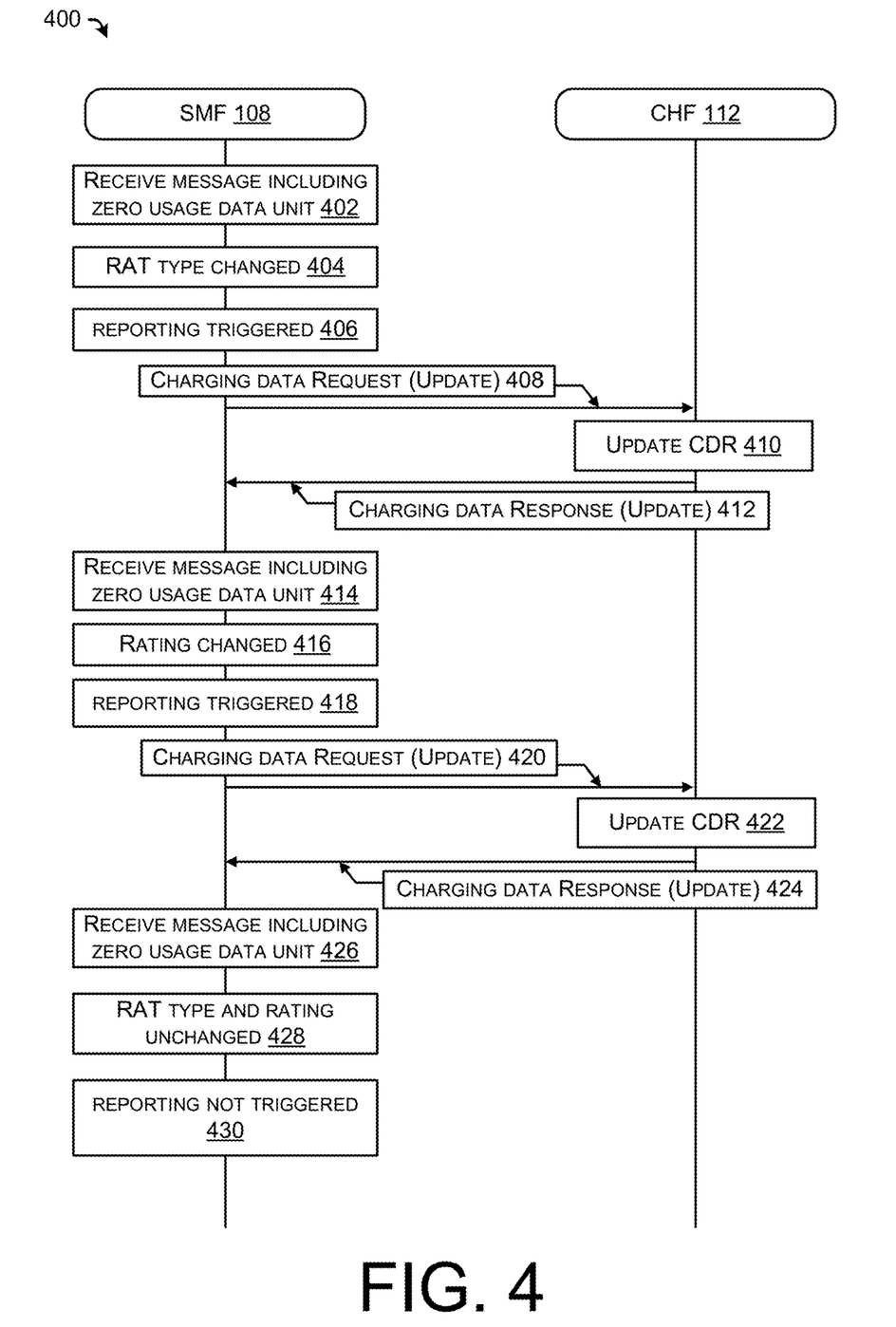
FIG. 4 illustrates an example charging scenario in a 5G network, in which an event is associated with zero usage data unit according to the present disclosure.

FIG. 4 illustrates an example charging scenario in a 5G network, in which an event is associated with zero usage data unit.

The charging scenario 400 shows an in-session charging scenario in the session-based charging (IEC) described with respect to FIG. 3. According to the charging scenario 400, a PDU session may be established between the UE and the service provider via the network. In some examples, the SMF 108 receives a message including zero usage data unit 402 during the session. As the previously granted data unit has zero usage, the default category to report the message may be configured as deferred or not reporting. The SMF 108 may determine whether the RAT type has changed (404). If it is determined that the RAT type has changed, the SMF 108 determines that the reporting is triggered 406. The SMF 108 may override the default category with the message to immediate and send an update charging data request 408 to the CHF 112. The CHF 112 updates the CDR 410 based on the update charging data request 408 and sends an update charging data response 412 to SMF 108.

In another example, the SMF 108 receives another message including zero usage data unit 414 during the session. The SMF 108 may determine whether the rating information has changed (416). If it is determined that the rating information has changed, the SMF 108 determines that the reporting is triggered (418). The SMF 108 may override the default category with the message to immediate and send an update charging data request 420 to the CHF 112. The CHF 112 updates the CDR (422) based on the update charging data request 420 and sends an update charging data response 424 to SMF 108.

In yet another example, the SMF 108 receives another message including zero usage data unit 426 during the session. The SMF 108 may determine that a reporting condition is not triggered (430).

It should be appreciated that the charging scenarios described in FIGS. 2A, 2B, 3, and 4 are merely for the illustration purposes. The present disclosure is not intended to be limiting. The 5G network may have charging scenarios defined for various types of sessions, unit determinations, rating categories, etc. Those charging scenarios may also be implemented on other network functions (NFS) to report charging data associated with the zero usage data units.

Figure 5:
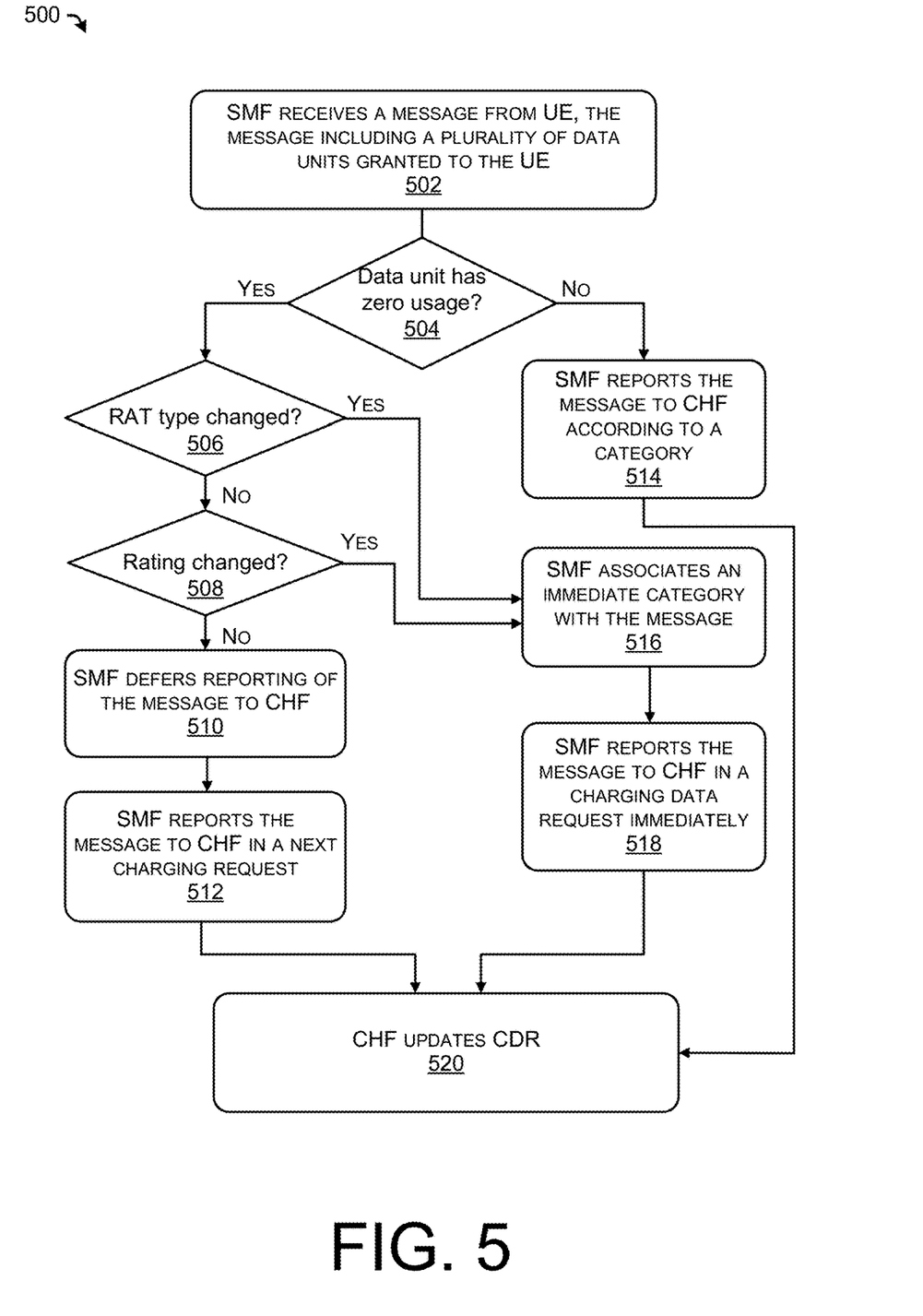
FIG. 5 illustrates an example process, in which an event is associated with zero usage data unit according to the present disclosure.

FIG. 5 illustrates an example process, in which an event is associated with zero usage data unit.

The example process 500 corresponds to the charging scenario 400 in the 5G system shown in FIG. 4 and may be performed by the SMF 108 and CHF 112, as illustrated in FIGS. 1-4.

At operation 502, the SMF receives a message from a UE, the message including a plurality of data units granted to the UE. As discussed herein, the operation 502 occurs after a PDU session is established by the SMF. The message includes information related to the PDU session that may trigger a charging condition. The message may further include the usage of the plurality of data units previously granted to the UE.

Each charging condition, also referred to as a chargeable event, is associated with a category that defines the urgency level of reporting. For a chargeable event in an immediate category, the SMF reports the chargeable event in a charging data request immediately. For a chargeable event in a deferred category, the SMF stores the chargeable event in the local storage. The SMF reports the chargeable event in a next charging data request or when the usage of the local storage reaches a threshold. A list of default trigger conditions may be configured at the SMF. In implementations, the SMF may override the default category of a trigger condition, thus, changing the urgency level of reporting the trigger condition.

At operation 504, the SMF determines whether a data unit has zero usage. As discussed herein, when the PDU session is established by the SMF, an initial number of data units are granted to the UE. The size of the data unit may vary from MBs to GBs. The message received at the SMF includes the usage of the initially granted data units. Some of the initially granted data units may be fully used while other data units may have not been consumed at all. In implementations, only the used data units will be reported to limit the HTTP payload size transmitted via the N40 interface between the SMF and the CHF. In other implementations, the data units with zero usage may also be reported if an event that impacts billing/rating occurs.

If no data unit has zero usage, the SMF reports the message to the CHF according to a category at operation 514. In implementations, the SMF reports the message according to the default category associated with the chargeable event in the message. The reporting from the SMF causes the CHF to update the CDR at operation 520. The CHF updates the user account information based on the usage of the initially granted data units. In implementations, the CHF updates the balance of the user account and/or the available data units based on the usage of the initially granted data units.

If there is at least one data unit having zero usage, the SMF further determines whether the RAT type has changed at operation 506. As discussed herein, the radio access technology change of the UE may affect the performance of the service delivery and the network operation. For example, a change from 4G access to 5G access enhances the user experience with the service being delivered but may consume more network bandwidth. In implementations, the usage of the granted data units prior to the RAT changing time point needs to be reported to CHF so as to optimize the network operation.

If the RAT type has changed, the SMF associates an immediate category with the message at operation 516. In implementations, the message may include one or more chargeable events at different categories. If a chargeable event is in a deferred category, the SMF overrides the default category with an immediate category. In implementations, the SMF may reverse the overriding of the category after the chargeable event is reported.

At operation 518, the SMF reports the message to the CHF in a charging data request immediately. In implementations, the SMF may reverse the overriding of the category after the chargeable event is reported. The reporting from the SMF further causes the CHF to update the CDR at operation 520.

If the RAT type has not changed, the SMF further determines whether the rating has changed. As discussed herein, rating information may affect the billing to the user account. For example, a tariff time change, a UE time zone change, or a PLMN change may cause new calculation of the billing to the user account after the change takes place. In implementations, the usage of the granted data units prior to the rating changing needs to be reported to CHF for billing purposes.

If the rating has changed, the SMF performs operation 516 and 518 sequentially to report the message to the CHF immediately. The reporting from the SMF further causes the CHF to update the CDR at operation 520.

If the rating has not changed, the SMF defers reporting of the message to the CHF at operation 510. As discussed herein, the SMF may store the message including zero usage data unit with no RAT type and rating change in the local storage.

At operation 512, the SMF reports the message to the CHF in a next charging data request. In some examples, the SMF may report the message if the usage of local storage reaches a threshold. The reporting of the message further causes the CHF to update the CDR at operation 520. The CDR further sends a charging data response to the SMF to complete the charging process.

It should be understood that the processes described above with respect to FIG. 5 is merely for illustration purposes. By way of examples but without limitation, various trigger conditions that may affect the billing and/or network performance can be used to evaluate whether an event should be reported immediately.

Figure 6:
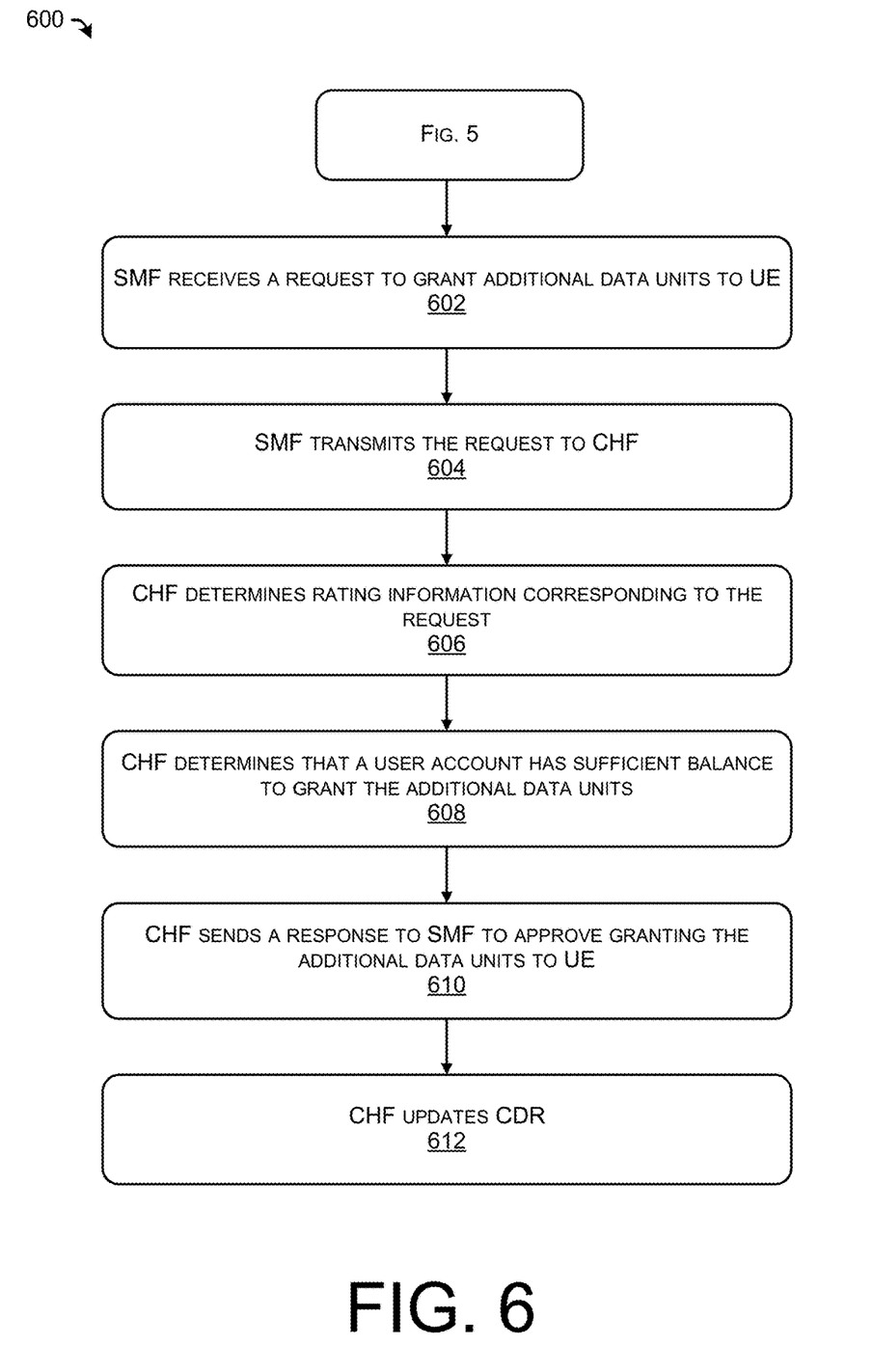
FIG. 6 illustrates another example process, in which an event is associated with zero usage data unit according to the present disclosure.

FIG. 6 illustrates another example process, in which an event is associated with zero usage data unit. The example process 600 may be performed by the SMF 108 and CHF 112, as illustrated in FIGS. 1-4.

The example process 600 may be a subsequent process of the example process 500 shown in FIG. 5 and may also be performed by the SMF 108 and CHF 112, as illustrated in FIGS. 1-4.

At operation 602, the SMF receives a request to grant additional data units to the UE. As discussed herein, a number of data units may be granted to the UE during the PDU session. To continue receiving the content and/or services, the UE may send a request for additional data units.

At operation 604, the SMF transmits the request to the CHF. The SMF may transmit the request for additional data units in a charging data request. The charging data request causes the CHF to determine rating information corresponding to the request at operation 606. As discussed herein, the rating information may be based on UE time zone, current tariff time, current RAT type, etc.

At operation 608, the CHF determines that a user account has sufficient balance to grant the additional data units. In some examples, the user account may allow unlimited data services. In yet other examples, the user may have enrolled a pre-paid plan, and thus, the balance is deducted each time the usage is reported.

At operation 610, the CHF sends a response to the SMF to approve granting the additional data units to the UE. As discussed herein, if the user account has sufficient balance, the CHF sends the charging data response to the SMF so as to grant the request for additional data units. Alternatively, if the user account has insufficient balance, the CHF sends the charging data response to the SMF to reject the request for additional data units.

At operation 612, the CHF updates the CDR. The CDR associated with the user account is updated based on whether the additional data units are granted or not. If the additional data units are granted to the UE, the CDR is updated to indicate the reserved additional data units. When the usage report of the additional data units is received, the CDR is further updated to reflect the actual usage of the additional data units.

Figure 7:
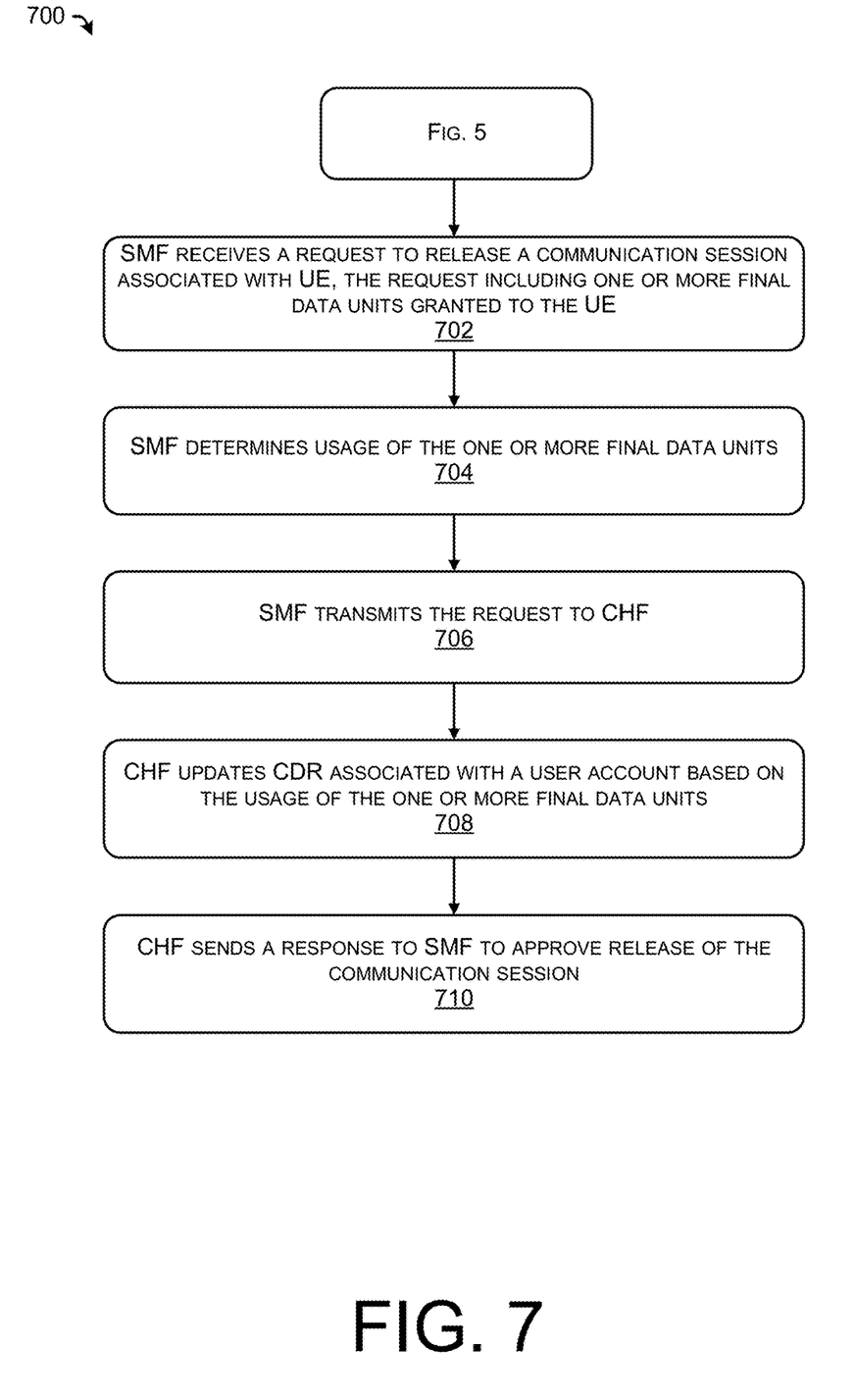
FIG. 7 illustrates yet another example process, in which an event is associated with zero usage data unit according to the present disclosure.

FIG. 7 illustrates yet another example process, in which an event is associated with zero usage data unit. The example process 700 may be performed by the SMF 108 and CHF 112, as illustrated in FIGS. 1-4.

The example process 700 may be another subsequent process of the example process 500 shown in FIG. 5 and may also be performed by the SMF 108 and CHF 112, as illustrated in FIGS. 1-4.

At operation 702, the SMF receives a request to release a communication session associated with UE, the request including one or more final data units granted to the UE. As discussed herein, when the service/content delivery to the UE is completed, the UE generates a request to terminate the communication session (i.e., a PDU session).

At operation 704, the SMF determines usage of the one or more final data units. As the UE may have not used the one or more final data units, the actual usage of the one or more final data units needs to be reported to the CHF for billing purposes.

At operation 706, the SMF transmits the requests to CHF. The SMF transmits the request to release the communication session in a charging data request.

At operation 708, the CHF updates CDR associated with a user account based on the usage of the one or more final data units. Upon receiving the charging data request, the CHF update the CDR for the user account based on the actual usage of the one or more final data units.

At operation 710, the CHF sends a response to SMF to approve release of the communication session.

Figure 8:
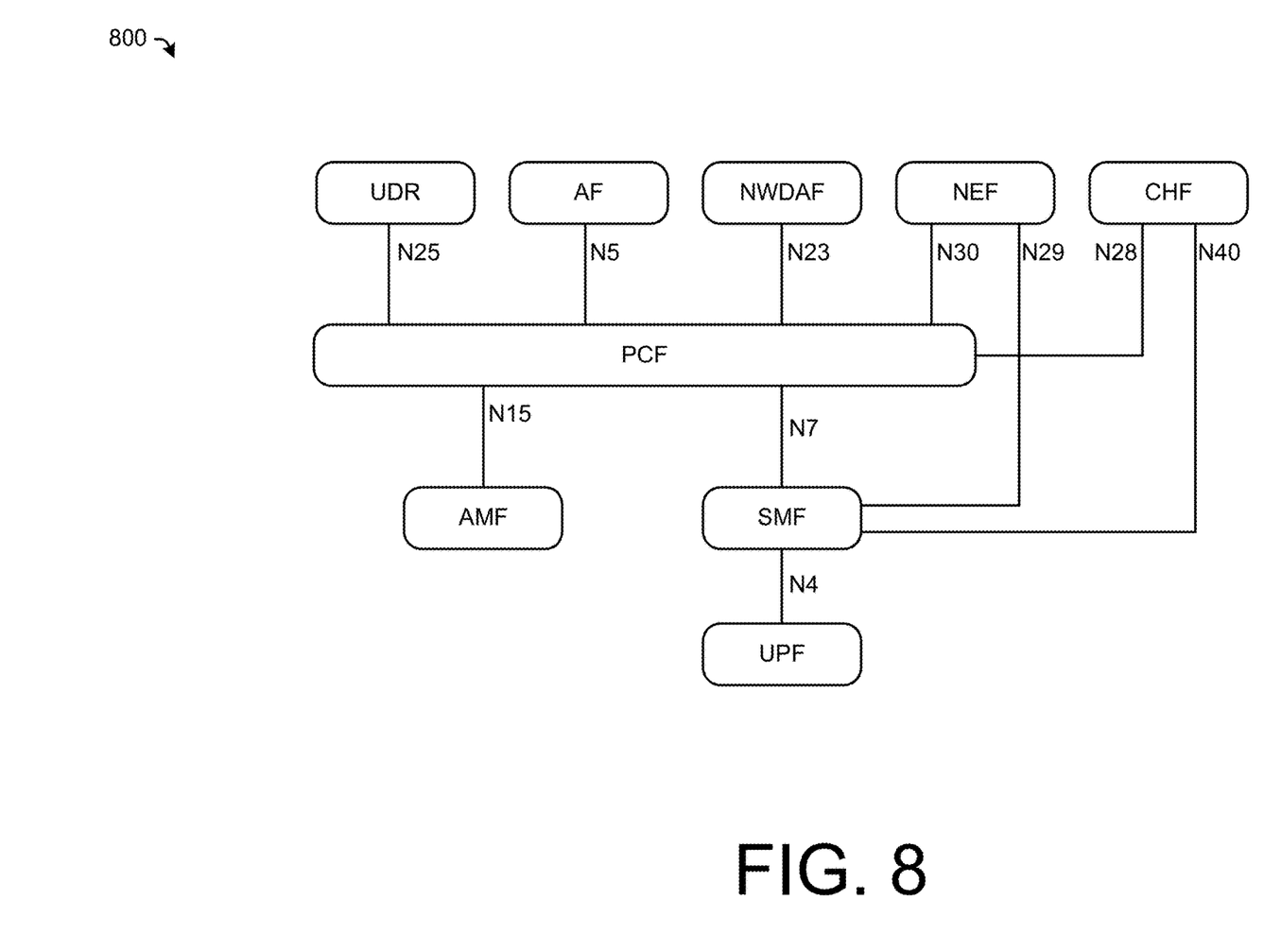
FIG. 8 illustrates an example network architecture, in which the SMF and the CHF are implemented to perform the charging function.

FIG. 8 illustrates an example network architecture, in which the SMF and the CHF are implemented to perform the charging function.

The network architecture 800 shows an example policy framework functionality in 5G network, in which the charging functionality is implemented. The network architecture 800 may comprise the 5G core network 102 in FIG. 1 that includes a service-based system architecture in which different types of network functions (NFs) operate alone and/or together to implement services. The network architecture 800, i.e., the policy framework functionality, may comprise the functions of the Policy Control Function (PCF), the policy and charging enforcement functionality supported by the Session Management Function (SMF) and the user plan function (UPF, the access and mobility policy enforcement functionality supported by the Access and Mobility Function (AMF), the Network Data Analytics Function (NWDAF), the Network Exposure Function (NEF), the Charging Function (CHF), the Unified Data Repository (UDR) and the Application Function (AF). The PCF communicates with various network functions (NFs) described above via different interfaces. For example, the PCT communicates with UDR via N25 interface, AF via N5 interface, NWDAF via N23 interface, NEF via N30 interface, CHF via N28 interface, AMF via N15 interface, and SMF via N7 interface. The SMF further communicates with NEF via N29 interface, CHF via N40 interface, and UPF via N4 interface.

The present disclosure provides solutions to report zero usage data units as an immediate trigger types during a PDU session. By evaluating whether there is an event related to RAT type change and/or rating change, the SMF may override a deferred category of an event from deferred to immediate and report the event to the CHF immediately. The present disclosure can monitor the network performance more efficiently by tracking the RAT type changes. Further, by updating the CDF the rating information, the present disclosure can improve the billing efficiency of the billing domain of the 5G network.

One or more of the 5G NFs described above can be implemented as network applications that execute within containers (not shown). The 5G NFs can execute as hardware elements, software elements, and/or combinations of the two within telecommunication network(s), and accordingly many types of 5G NFs can be implemented as software and/or as virtualized functions that execute on cloud servers or other computing devices. Network applications that can execute within containers can also include any other type of network function, application, entity, module, element, or node.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented by a session management function (SMF), the method comprising:
    receiving, from a user equipment (UE), a message in a communication session established between the UE and a network, the message including a plurality of data units granted to the UE;
    determining, from the message, usage of the plurality of data units;
    determining that an event occurs during the communication session, wherein the event is associated with a data unit having zero usage and indicates a rating information change;
    determining that the event triggers a charging condition;
    generating a charging data request based on the usage of the plurality of data units and the event;
    transmitting, to a charging function (CHF), the charging data request;
    reporting, to the CHF, the event in the charging data request;
    receiving, from the UE, a request to grant additional data units;
    transmitting, to the CHF, the request, causing the CHF to perform actions including:
        determining a rating information corresponding to the request, and
        determining that a user account has sufficient balance based on the rating information and the additional data units; and
    receiving, from the CHF, an approval to grant the additional data units to the UE.

2. The method of claim 1, further comprising:
    determining that the event further indicates a radio access technology (RAT) change; and
    associating an immediate report category with the event.

3. The method of claim 2, further comprising:
    receiving, from the UE, a request to release the communication session, the request including one or more final data units granted to the UE;
    determining, from the request, usage of the one or more final data units;
    transmitting, to the CHF, the request, causing the CHF to perform actions including:
        updating a charging data record (CDR) associated with a user account
        based on the usage of the one or more final data units; and
    receiving, from the CHF, an instruction to terminate the communication session.

4. The method of claim 3, further comprising:
    obtaining a default category associated with the event; and
    in response to the default category being a deferred report category, restoring the event to the default category.

5. The method of claim 1, further comprising:
    determining that the event indicates neither radio access technology (RAT) change nor rating information change;
    associating a deferred report category with the event;
    storing the event in a cache; and
    reporting, to a charging function (CHF), the event in a subsequent charging data request.

6. The method of claim 1, wherein an individual data unit is configured to transmit data in 1 GB per second.

7. A system comprising:
    a processor, and
    a memory storing instructions executed by the processor to perform operations including:
        receiving, from a user equipment (UE), a message in a communication session established between the UE and a network, the message including a plurality of data units granted to the UE;
        determining, from the message, usage of the plurality of data units;
        determining that an event occurs during the communication session, wherein the event is associated with a data unit having zero usage, and indicates a rating information change;
        determining that the event triggers a charging condition; and
        generating a charging data request based on the usage of the plurality of data units and the event;
        transmitting, to a charging function (CHF), the charging data request;
        reporting, to the CHF, the event in the charging data request;
        receiving, from the UE, a request to release the communication session, the request including one or more final data units granted to the UE;

determining, from the request, usage of the one or more final data units;
transmitting, to the CHF, the request causing the CHF to perform actions including:
    updating a charging data record (CDR) associated with a user account based on the usage of the one or more final data units; and
    receiving, from the CHF, an approval to terminate the communication session.

8. The system of claim 7, wherein the operations further comprise:
determining that the event further indicates a radio access technology (RAT) change; and
associating an immediate report category with the event.

9. The system of claim 8, wherein the operations further comprise:
receiving, from the UE, a request to grant additional data units;
transmitting, to the CHF, the request, causing the CHF to perform actions including:
    determining a rating information corresponding to the request, and
    determining that a user account has sufficient balance based on the rating information and the additional data units; and
receiving, from the CHF, an instruction to grant the additional data units to the UE.

10. The system of claim 8, wherein the operations further comprise:
obtaining a default category associated with the event; and
in response to the default category being a deferred report category, restoring the event to the default category.

11. The system of claim 7, wherein the operations further comprise:
determining that the event indicates neither radio access technology (RAT) change nor rating information change;
associating a deferred report category with the event;
storing the event in a cache; and
reporting, to a charging function (CHF), the event in a subsequent charging data request.

12. The system of claim 7, wherein an individual data unit is configured to transmit data in 1 GB per second.

13. One or more non-transitory computer-readable storage media storing computer-readable instructions, that when executed by one or more processors, cause the one or more processors to perform operations comprising:
receiving, from a user equipment (UE), a message in a communication session established between the UE and a network, the message including a plurality of data units granted to the UE;
determining, from the message, usage of the plurality of data units;
determining that an event occurs during the communication session, wherein the event is associated with a data unit having zero usage and indicates a rating information change;
determining that the event triggers a charging condition; and
generating a charging data request based on the usage of the plurality of data units and the event;
transmitting, to a charging function (CHF), the charging data request;
reporting, to the CHF, the event in the charging data request;
receiving, from the UE, a request to grant additional data units;
transmitting, to the CHF, the request, causing the CHF to perform actions including:
    determining a rating information corresponding to the request, and
    determining that a user account has sufficient balance based on the rating information and the additional data units; and
receiving, from the CHF, an instruction to grant the additional data units to the UE.

14. The one or more non-transitory computer-readable storage media of claim 13, wherein the operations further comprise:
determining that the event further indicates a radio access technology (RAT) change; and
associating an immediate report category with the event.

15. The one or more non-transitory computer-readable storage media of claim 14, wherein the operations further comprise:
receiving, from the UE, a request to release the communication session, the request including one or more final data units granted to the UE;
determining, from the request, usage of the one or more final data units;
transmitting, to the CHF, the request causing the CHF to perform actions including:
    updating a charging data record (CDR) associated with a user account based on the usage of the one or more final data units; and
receiving, from the CHF, an approval to terminate the communication session.

\* \* \* \* \*